(12) United States Patent
Pratt et al.

(10) Patent No.: US 11,567,572 B1
(45) Date of Patent: Jan. 31, 2023

(54) AUGMENTED REALITY OBJECT MANIPULATION

(71) Applicants: AT&T Intellectual Property I, L.P., Atlanta, GA (US); AT&T Mobility II LLC, Atlanta, GA (US)

(72) Inventors: James Pratt, Round Rock, TX (US); Jason Decuir, Cedar Park, TX (US); Terrel Lecesne, Round Rock, TX (US); Eric Zavesky, Austin, TX (US)

(73) Assignees: AT&T Intellectual Property I, L.P., Atlanta, GA (US); AT&T Mobility II LLC, Atlanta, GA (US)

( * ) Notice: Subject to any disclaimer, the term of this patent is extended or adjusted under 35 U.S.C. 154(b) by 0 days.

(21) Appl. No.: 17/403,611

(22) Filed: Aug. 16, 2021

(51) Int. Cl.
*G06F 3/01* (2006.01)
*G06V 20/40* (2022.01)

(52) U.S. Cl.
CPC .............. *G06F 3/014* (2013.01); *G06V 20/41* (2022.01)

(58) Field of Classification Search
CPC .......... G06F 3/014; G06F 3/016; G06V 20/41
See application file for complete search history.

(56) References Cited

U.S. PATENT DOCUMENTS

| | | | |
|---|---|---|---|
| 8,094,090 B2* | 1/2012 | Fisher ................ | A63B 24/0006 434/247 |
| 2006/0017654 A1* | 1/2006 | Romo .................... | G06F 3/016 345/592 |
| 2016/0093108 A1* | 3/2016 | Mao ....................... | A63F 13/493 345/633 |
| 2020/0082588 A1* | 3/2020 | Fink ........................ | G06V 20/41 |
| 2021/0209770 A1* | 7/2021 | Kamyshanska ........... | G06T 7/74 |

OTHER PUBLICATIONS

Picheta, R., "Paramedics could use a 5G-powered 'robo glove' to make quicker diagnoses", CNN Health, Jun. 24, 2019, 11 pages, accessed from https://www.cnn.com/2019/06/24/health/5g-paramedics-glove-scli-gbr-intl/index.html.
Rizzo, D., et al., "The Effect of Haptic Feedback in a Remote Grasping Situation", American Institute of Aeronautics and Astronautics, Mar. 8, 2004, 7 pages.
Benko., H., et al., "NormalTouch and TextureTouch: High-fidelity 3D Haptic Shape Rendering on Handheld virtual Reality Controllers", UIST, 2016, 12 pages.
Coxworth, B., "Robotic glove powers up paralyzed hands", Health & Wellbeing, Jan. 16, 2020, 10 pages, accessed from https://newatlas.com/health-welibeing/neofect-neomano-paralyzed-hand-glove/.
SenseGlove Nova, "The new Sense in VR for enterprise", 7 pages, accessed on Aug. 21, 2021 from https://www.senseglove.com/product/nova/?cn-reloaded=1.

* cited by examiner

*Primary Examiner* — Stephen G Sherman

(57) ABSTRACT

A processing system having at least one processor may detect a first object in a first video of a first user and detect a second object in a second video of a second user, where the first video and the second video are part of a visual communication session between the first user and the second user. The processing system may further detect a first action in the first video relative to the first object, detect a second action in the second video relative to the second object, detect a difference between the first action and the second action, and provide a notification indicative of the difference.

20 Claims, 4 Drawing Sheets

AUGMENTED REALITY OBJECT MANIPULATION

The present disclosure relates generally to visual communication sessions, and more particularly to methods, computer-readable media, and devices for providing a notification indicative of a detected difference in actions relating to a first object in a first video and a second object in a second video of a visual communication session.

BRIEF DESCRIPTION OF THE DRAWINGS

The teachings of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
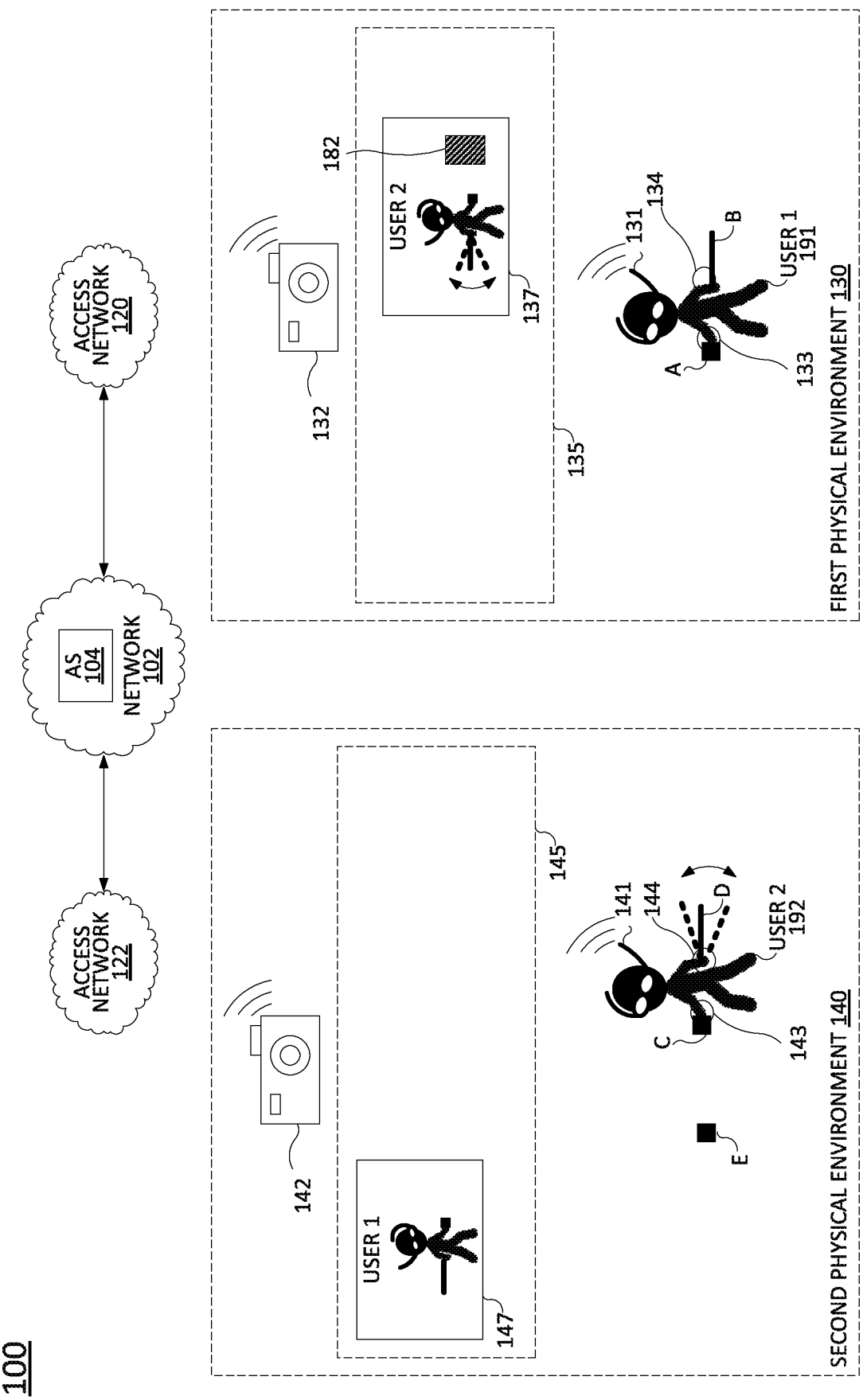
FIG. 1 illustrates an example network related to the present disclosure.

In one example, the present disclosure describes a method, computer-readable medium, and device for providing a notification indicative of a detected difference in actions relating to a first object in a first video and a second object in a second video of a visual communication session. For instance, in one example, a processing system having at least one processor may detect a first object in a first video of a first user and detect a second object in a second video of a second user, where the first video and the second video are part of a visual communication session between the first user and the second user. The processing system may further detect a first action in the first video relative to the first object, detect a second action in the second video relative to the second object, detect a difference between the first action and the second action, and provide a notification indicative of the difference.

Examples of the present disclosure provide a network-based system that facilitates proper physical object manipulation via a visual communication session (e.g., mixed reality (MR), augmented reality (AR), virtual reality (VR), or other video-based communication sessions) between at least two users. For instance, in one example, the present disclosure may facilitate remote assistance where one party is engaged to help another fix an issue relating to an object/item. For example, a visual communication session may be established between endpoint devices of two users. In one example, a processing system of the present disclosure may detect and/or map respective environments and objects therein via computer vision processing techniques, 3D sensor readings, or other local sensor techniques (e.g., infrared (IR) light field detection, etc.). For instance, the system may determine specific objects and room topology for segmentation. In one example, the present disclosure may also determine users' intentions, on both sides of the visual communication session, so that the system can isolate which objects are being interacted with. In one example, the present disclosure may also mask out and transmit relevant aspects of the environment and object(s). In particular, transmission of video, audio, and virtual objects may be constrained by a combination of objects, environment/room features, and user intention. In addition, in one example, the present disclosure may also align to specific objects on either side of the transmission. For example, the present disclosure may align an expert's manipulation of a router to a router on a client's side.

To illustrate, an expert may be communicating with a remote user via a visual communication session to repair equipment at the user's house. If the user does not know how to repair the equipment, the expert may instruct the user verbally. As in the past, the expert may provide a video, animation, or the like, or may draw additional visuals to show the user. In addition, the expert may provide a demonstration via video for the user to see and follow. However, in accordance with the present disclosure, a user's virtual environment may be enhanced, e.g., with respect to the actual item/object in front of the user, to demonstrate a proper repair. It should be noted that although the term "expert" is used throughout the present disclosure, as referred to herein, the term is not intended to convey a guarantee of a particular level of expertise, but rather is indicative of any user who may be assisting or instructing another user, e.g., even if the advice or assistance is wrong, even if other "experts" may disagree with the recommended or demonstrated actions, etc.

In an illustrative example, an expert (broadly an instructor) and another user may start a new visual communication session. In one example, the establishment of the visual communication session may be triggered by passive monitoring or specific mentioning of a task, in response to which the user's device may connect the user's device and a device of the expert via a network-based processing system of the present disclosure. The processing system may therefore create the session and begin to detect objects and aspects of the environments for both sides. Each side may include cameras, microphones, positional sensors, and other sensors, AR devices, and so forth, from which the processing system may collect various data. In one example, the processing system may also be provided with or have access to known topologies (e.g., floor plan, etc.). Accordingly, the processing system may generate maps of the three-dimensional (3D) environments of both sides.

The processing system may additionally determine objects of interest for the visual communication session. For example, if the task is known and relates to fixing a set-top box (STB) or television problem, only the object models relevant to the task may be loaded for detection. As such, visual data feeds from both sides may be evaluated against specific object models to detect the presence of, and to identify those specific objects/items. It should be noted that other tasks may have other object models related thereto and which may be loaded/activated when a visual communication session for such tasks may take place. In one example, object detection and recognition may be enhanced by reference to record(s) of the user's current install and equipment, e.g., as recorded in a telecommunication service provider user database.

In addition, the processing system may determine intentions of actors on both sides. For example, the processing system may observe movements of both the expert and the user, and may utilize other engagement metrics (e.g., gaze direction, touch sensing, vocal utterances, and so on). Alternatively, or in addition, the processing system may determine if the users are moving objects, or moving two or more objects near each other (as defined/needed by the task), such as bringing a cable closer to a television or STB. Accordingly, the processing system may resolve specific objects of interest by a combination of (1) object detection and/or identification and (2) user intention. In one example, the processing system may edit video/visual feeds to transmit objects of interest and to mask/hide irrelevant objects or other aspects of the environment, e.g., unless the users determine more background is helpful or required.

In accordance with the present disclosure, both parties may be equipped with force feedback gloves (e.g., haptic gloves) to render co-present touch of objects on both sides. For example, if the user is engaged with an item (e.g., a screwdriver, or a cable) and using a force feedback glove (or gloves), the processing system may allow the user to relinquish control and enable the expert to assume remote control of the user's force feedback glove(s) via the expert's force feedback glove(s). For instance, the expert and the user may both engage one or more objects with the respective gloves and hold the object(s) in relatively the same positions, at which point a command or commands from one or both of the parties may activate remote control by the expert. The expert's force feedback glove(s) can then send signals for manipulating an object that trigger corresponding actions on the user's force feedback glove(s). For example, the expert may manipulate the object(s) on the expert's side, and the user's force feedback glove(s) may be engaged via control signals to perform corresponding manipulations of the same/similar object(s) on the user's side.

In one example, the expert's force feedback glove(s) may translate the expert's motions so that remote user will feel the directionality of the expert's instructions and/or gestures, and potentially take advantage of the expert's advanced manual dexterity. In addition, in one example, the expert may define maximum force boundaries in specific tasks by setting example "pull this hard" limits, and the customer can feel resistance based on that transmitted intensity. In one example, force feedback may be tuned or overridden according to user comfort or compliance in the interaction. Upon completion, thresholds for interaction, alignment, etc. may be saved and used for a future review of the expert's task execution, for automated learning of the task for automated expert avatars, virtual assistants, or the like, and so on.

In one example, newly relevant objects on the user side may become visible to the expert, such as safety hazards. For instance, a stack of papers may be irrelevant to proper task performance and may initially be excluded from the video/visual feed. However, if the stack of papers is near a newly plugged-in piece of electronic equipment, such as a STB, the papers may now be a fire hazard and may be brought back into the video/visual feed from the user's side that is transmitted to the expert. Similarly, tools brought into view but not acknowledged by the user may nevertheless be included in the video/visual feed of the user that is transmitted to the expert, e.g., based on knowledge of the particular task. For instance, if the task is known, then the tools that are customarily used for the task may also be known. Thus, even if the tool is not acknowledged by the user, it may nevertheless be considered relevant and included in the view of the user that is provided to the expert.

In one example, the user and/or expert may "swipe out" objects or gesture to blur out objects from the interaction. In addition, the processing system may maintain a record of these selections for a next iteration/interaction to exclude similar categories or specific objects (e.g., valuables or dirty laundry in a closet). Likewise, in one example, the processing system may redact or remove objects, or may add virtual objects based upon users' security levels, priority, etc. Similarly, the user, the expert, or both may override modifications to the videos/visual feeds for safety concerns (e.g., boiling water that is dangerous and needs attention). In one example, the present disclosure may also cause augmented reality (AR) displays to re-light aspects of an environment and/or to activate ambient lighting to relight and target specific objects in a room or other environments (e.g., projectors for visuals, and similarly audio for interactions).

In one example, the present disclosure may incorporate a machine learning (ML)-based virtual assistant to first attempt diagnostics or triage of the problem, thus freeing experts for more intricate/novel issues. In one example, visual communication sessions for a task/problem may be recorded by the processing system and organically added as potential solutions (e.g., at least from the expert side). For example, as more instances of one or more experts repairing a device are recorded, the tools used to repair the device may be added to the object manifest for faster detection and alternate solution discovery (e.g., "I saw a previous customer use tool X to solve this shortcoming"). In one example, a virtual assistant (VA)/voice assistant may supplement an expert in assisting a user in correctly solving a problem by providing suggested next steps or other hints based upon knowledge of the task (e.g., "you may be too far from the model," "you'll need this tool next so keep it close," etc.). Similarly, the processing system may learn automated steps and correctly branch to those automated steps to match the best conditions for the benefit of both the expert and the user (e.g., to enable the expert to not have to look-up or remember a next step for a complex task, a task that is performed infrequently, etc.). In addition, examples of the present disclosure may provide improved disambiguation for complex tasks. For instance, if there are multiple "yellow cables," the advanced color analysis of the processing system may provide a user with a better indication of which one to use (e.g., by matching to the most correct shade of yellow).

Thus, examples of the present disclosure give a highly precise alignment of environments and objects to enable remote control (e.g., if both sides are manipulating the same object, the processing system can map hand placement). In addition, the force feedback provided thereby may enable potential muscle memory/training and may be used for repair or assembly tasks, remote coaching (e.g., music playing or learning sports), and so on. In addition, examples of the present disclosure enable a remote expert to interact with a user in the user's environment while maintaining user privacy. An expert is able to "remote control" a fix by touching an example object on the expert's side, and using system alignment on the user side. In one example, the processing system may replicate the expert's manipulation of the object on the customer's force feedback glove(s). Alternatively, or in addition, the target object may be made to blink, highlighted or otherwise visually enhanced to draw the user's attention. By synchronizing interactions between both sides (instead of just reading off a workflow), the expert is freed to focus more heavily on interaction with the user. These and other aspects of the present disclosure are described in greater detail below in connection with the examples of FIGS. 1-4.

To further aid in understanding the present disclosure, FIG. 1 illustrates an example system 100 in which examples of the present disclosure may operate. The system 100 may include any one or more types of communication networks, such as a traditional circuit switched network (e.g., a public switched telephone network (PSTN)) or a packet network such as an Internet Protocol (IP) network (e.g., an IP Multimedia Subsystem (IMS) network), an asynchronous transfer mode (ATM) network, a wireless network, a cellular network (e.g., in accordance with 3G, 4G/long term evolution (LTE), 5G, etc.), and the like related to the current disclosure. It should be noted that an IP network is broadly defined as a network that uses Internet Protocol to exchange data packets. Additional example IP networks include Voice over IP (VoIP) networks, Service over IP (SoIP) networks, and the like.

In one example, the system 100 may comprise a network 102, e.g., a telecommunication service provider network, a core network, an enterprise network comprising infrastructure for computing and communications services of a business, an educational institution, a governmental service, or other enterprises. The network 102 may be in communication with one or more access networks 120 and 122, and the Internet (not shown). In one example, network 102 may combine core network components of a cellular network with components of a triple play service network; where triple-play services include telephone services, Internet services and television services to subscribers. For example, network 102 may functionally comprise a fixed mobile convergence (FMC) network, e.g., an IP Multimedia Subsystem (IMS) network. In addition, network 102 may functionally comprise a telephony network, e.g., an Internet Protocol/Multi-Protocol Label Switching (IP/MPLS) backbone network utilizing Session Initiation Protocol (SIP) for circuit-switched and Voice over Internet Protocol (VoIP) telephony services. Network 102 may further comprise a broadcast television network, e.g., a traditional cable provider network or an Internet Protocol Television (IPTV) network, as well as an Internet Service Provider (ISP) network. In one example, network 102 may include a plurality of television (TV) servers (e.g., a broadcast server, a cable head-end), a plurality of content servers, an advertising server (AS), an interactive TV/video on demand (VoD) server, and so forth.

Figure 4:
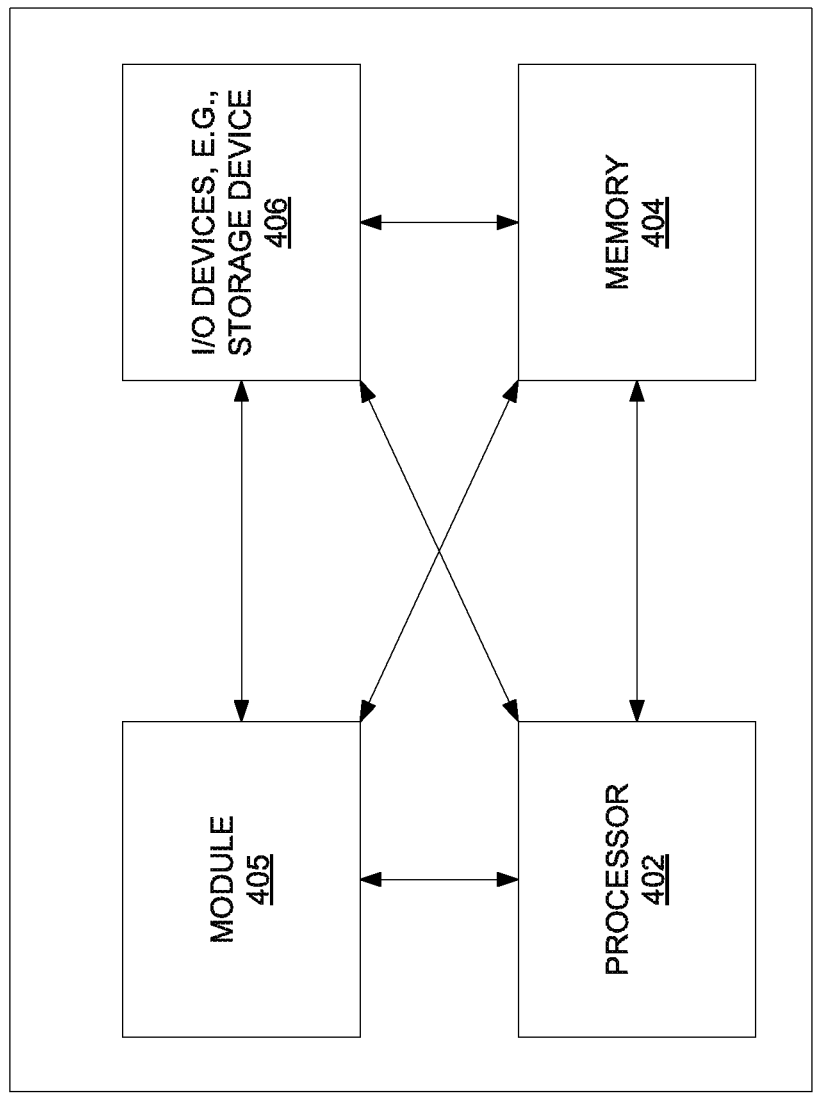
FIG. 4 illustrates a high level block diagram of a computing device specifically programmed to perform the steps, functions, blocks and/or operations described herein.

In accordance with the present disclosure, application server (AS) 104 may comprise a computing system or server, such as computing system 400 depicted in FIG. 4, and may be configured to provide one or more operations or functions for providing a notification indicative of a detected difference in actions relating to a first object in a first video and a second object in a second video of a visual communication session, as described herein. It should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device including one or more processors, or cores (e.g., as illustrated in FIG. 4 and discussed below) or multiple computing devices collectively configured to perform various steps, functions, and/or operations in accordance with the present disclosure.

Thus, although only a single application server (AS) 104 is illustrated, it should be noted that any number of servers may be deployed, and which may operate in a distributed and/or coordinated manner as a processing system to perform operations for detecting and modifying actions of visual representations of users in visual content, in accordance with the present disclosure. In one example, AS 104 may comprise a physical storage device (e.g., a database server), to store various types of information in support of systems for providing a notification indicative of a detected difference in actions relating to a first object in a first video and a second object in a second video of a visual communication session, in accordance with the present disclosure. For example, AS 104 may store object recognition models, user data (including user device data), task templates/maps (e.g., comprising sequences of steps/actions to perform to complete an overall task), and so forth that may be processed by AS 104 in connection with establishing visual communication sessions, or that may be provided to devices establishing visual communication sessions via AS 104. AS 104 may further create and/or store action detection models that may be utilized in connection with the present examples. For ease of illustration, various additional elements of network 102 are omitted from FIG. 1.

In one example, the access networks 120 and 122 may comprise Digital Subscriber Line (DSL) networks, public switched telephone network (PSTN) access networks, broadband cable access networks, Local Area Networks (LANs), wireless access networks (e.g., an IEEE 802.11/Wi-Fi network and the like), cellular access networks, $3^{rd}$ party networks, and the like. For example, the operator of network 102 may provide a cable television service, an IPTV service, or any other types of telecommunication service to subscribers via access networks 120 and 122. In one example, the access networks 120 and 122 may comprise different types of access networks, may comprise the same type of access network, or some access networks may be the same type of access network and others may be different types of access networks. In one example, the network 102 may be operated by a telecommunication network service provider. The network 102 and the access networks 120 and 122 may be operated by different service providers, the same service provider or a combination thereof, or may be operated by entities having core businesses that are not related to telecommunications services, e.g., corporate, governmental or educational institution LANs, and the like.

In one example, the access network 120 may be in communication with a device 131. Similarly, access network 122 may be in communication with one or more devices, e.g., device 141. Access networks 120 and 122 may transmit and receive communications between devices 131 and 141, between devices 131 and 141, and application server (AS) 104, other components of network 102, devices reachable via the Internet in general, and so forth. In one example, each of devices 131 and 141 may comprise any single device or combination of devices that may comprise a user endpoint device. For example, the devices 131 and 141 may each comprise a mobile device, a cellular smart phone, a wearable computing device (e.g., smart glasses, goggles or headsets) a laptop, a tablet computer, a desktop computer, an application server, a bank or cluster of such devices, and the like. In one example, devices 131 and 141 may each comprise programs, logic or instructions for providing a notification indicative of a detected difference in actions relating to a first object in a first video and a second object in a second video of a visual communication session. For example, devices 131 and 141 may each comprise a computing system or device, such as computing system 400 depicted in FIG. 4, and may be configured to provide one or more operations or functions in connection with examples of the present disclosure for providing a notification indicative of a detected difference in actions relating to a first object in a first video and a second object in a second video of a visual communication session, as described herein.

In one example, the device 131 is associated with a first user (user 1) 191 at a first physical environment 130. As illustrated in FIG. 1, the device 131 may comprise a wearable computing device (e.g., smart glasses) and may provide a user interface 135 for user 191. For instance, device 131 may comprise smart glasses with augmented reality (AR) enhancement capabilities. For example, endpoint device 131 may have a screen and a reflector to project outlining, highlighting, or other visual markers to the eye(s) of user 191 to be perceived in conjunction with the surroundings. In the present example, device 131 may present a window 137 within or via the user interface 135. Also associated with user 191 and/or first physical environment 130 is a camera 132 which may be facing user 191 and which may capture a video comprising the first physical environment 130, including user 191 and other items or objects therein, such as sticks A and B. In one example, camera 132 may communicate with device 131 wirelessly, e.g., to provide a video stream of the first physical environment 130. As an alternative, or in addition, in one example, device 131 may also comprise an outward facing camera to capture video of the first physical environment 130 from a field of view in a direction that user 191 is looking.

In one example, the device 131 may present visual content of one or more other users via user interface 135 (e.g., presented as window 137 in FIG. 1). In one example, the physical environment 130 and user interface 135 may comprise an augmented reality (AR) or a mixed reality (MR) environment, e.g., when the physical environment 130 remains visible to user 191 when using device 131, and the visual content received from one or more other users is presented spatially in an intelligent manner with respect to the physical environment 130. In one example, the components associated with user 191 and/or first physical environment 130 that are used to establish and support a visual communication session may be referred to as a "communication system." For instance, a communication system may comprise device 131, or device 131 in conjunction with camera 132, device 131 in conjunction with wearable force feedback gloves 133 and 134, device 131 in conjunction with a smartphone or personal computer, a wireless router, or the like supporting visual communication sessions of device 131, and so on.

Similarly, device 141 may be associated with a second user (user 2) 192 at a second physical environment 140. As illustrated in FIG. 1, the device 141 may comprise a wearable computing device that is the same or similar to device 131. However, in another example, device 141 may comprise a personal computer, desktop computer, or the like. As further illustrated in FIG. 1, device 141 may provide a user interface 145 for user 192 that displays at least one window 147. Also associated with user 192 and/or second physical environment 140, is a camera 142 which may be facing user 192 and which may capture a video comprising the second physical environment 140, including user 192 and other items or objects therein. In one example, camera 142 may be coupled to device 141 and may provide a video stream of the second physical environment 140.

As illustrated in FIG. 1, user 192 may also have force feedback gloves 143 and 144 which may measure, record, and/or transmit data related to movement and position, such as locations, orientations, accelerations, and so forth. For instance, force feedback gloves 143 and 144 may each include a Global Positioning System (GPS) units, a gyroscope, a compass, one or more accelerometers, and so forth. Force feedback gloves 143 and 144 may also include a plurality of actuators which may be controllable (e.g., remotely) to provide positive force and/or movement of various portions of the hands of user 192 (e.g., electromechanical actuators or motors, electro-hydraulic actuators, electro-pneumatic actuators, etc.). In one example, force feedback gloves 143 and 144 may include transceivers for wireless communications, e.g., for Institute for Electrical and Electronics Engineers (IEEE) 802.11 based communications (e.g., "Wi-Fi"), IEEE 802.15 based communications (e.g., "Bluetooth", "ZigBee", etc.), cellular communication (e.g., 3G, 4G/LTE, 5G, etc.), and so forth. User 191 may be similarly equipped with force feedback gloves 133 and 134, which may be the same or similar to force feedback gloves 143 and 144. As such, force feedback gloves 143 and 144 may provide various measurements to device 141 and/or to AS 104 (e.g., via device 141 and/or via access network 122) and may similarly receive control signals from force feedback gloves 133 and 134, device 141, AS 104, etc. Similarly, force feedback gloves 133 and 134 may provide various measurements to device 131 and/or to AS 104 (e.g., via device 131 and/or via access network 120) and may similarly receive control signals from force feedback gloves 143 and 144, device 131, AS 104, etc.

In one example, devices 131 and 141 may communicate with each other and/or with AS 104 to establish, maintain/operate, and/or tear-down a visual communication session. In one example, AS 104 and device 131 and/or device 141 may operate in a distributed and/or coordinated manner to perform various steps, functions, and/or operations described herein. To illustrate, AS 104 may establish and maintain visual communication sessions for various users and may store and implement one or more configuration settings specifying both inbound and outbound modifications of visual content from the various users. The visual content may comprise video content, which may include visual imagery of a physical environment (e.g., including imagery of one or more users), and which in some cases may further include recorded audio of the physical environment.

As used herein, the terms augmented reality (AR) environment and virtual environment may be used herein to refer to the entire environment experienced by a user, including real-world images and sounds combined with images and sounds of the AR environment/virtual environment. The images and/or sounds (or portions thereof) of an AR environment may be referred to as "virtual objects" and may be presented to users via devices and systems of the present disclosure. While the real world may include other machine generated images and sounds, e.g., animated billboards, music played over loudspeakers, and so forth, these images and sounds are considered part of the "real-world," in addition to natural sounds and sights such as other physically present humans and the sound they make, the sound of wind through buildings, trees, etc., the sight and movement of clouds, haze, precipitation, sunlight and its reflections on surfaces, and so on.

In one example, AS 104 may receive a request to establish a visual communication session from device 131 and/or device 141. The visual communication session may be established for such devices after AS 104 retrieves one or more configuration settings for the user 191 and/or user 192, determines which configuration setting(s), if any, to apply based upon the context(s), and activates the respective object detection models, action detection models, and/or configuration setting(s) which are determined to apply to the context(s). The request may be received via access network 120, access network 122, network 102, and/or the Internet in general, and the visual communication session may be provided via any one or more of the same networks.

The establishment of the visual communication session may include providing security keys, tokens, certificates, or the like to encrypt and to protect the media streams between devices 131 and 141 when in transit via one or more network and to allow devices 131 and 141 to decrypt and present received video content and/or received user interface content via user interfaces 135 and 145, respectively. In one example, the establishment of the visual communication session may further include reserving network resources of one or more networks (e.g., network 102, access networks 120 and 122, etc.) to support a particular quality of service (QoS) for the visual communication session (e.g., a certain video resolution, a certain delay measure, and/or a certain packet loss ratio, and so forth). Such reservation of resources may include an assignment of slots in priority queues of one or more routers, the use of a particular QoS flag in packet headers which may indicate that packets should be routed with a particular priority level, the establishment and/or use of a certain label-switched path with a guaranteed latency measure for packets of the visual communication session, and so forth.

In one example, AS 104 may establish a communication path such that media streams between device 131 and device 141 pass via AS 104, thereby allowing AS 104 to implement modifications to the visual content in accordance with the applicable configuration setting(s). The one or more configuration settings may be user-specified, may be based upon the capabilities of devices of user 191 and/or user 192 being used for the visual communication session, may be specific to the context (e.g., a particular task for which user 191 is obtaining assistance from user 192), and so forth. As just one example, device 131 may provide information regarding the capabilities and capacities of device 131 and camera 132 to AS 104 in connection with a request to establish a visual communication session with device 141. AS 104 may send a notification of the request to device 141. Similarly, device 141 may provide information regarding the capabilities and capacities of device 141 and camera 142 to AS 104 in connection with a response to the request/notification to establish the visual communication session.

In one example, the visual communication session may be a joint AR session, e.g., established privately among the users via AS 104 and/or the users' respective communication systems, or hosted by AS 104 for public or semi-public usage. In one example, device 131 and/or device 141 may indicate a purpose for the visual communication session (e.g., further context). For example, a particular task of installing a set-top box, performing physical therapy on a leg of user 191, etc. may be indicated. In this regard, AS 104 may maintain different settings to match to different contexts, e.g., different tasks. For instance, each task may have a different set of object detection and/or recognition models and a different set of action detection models. In addition, in one example, each task may have different workflows/maps comprising sequences of actions to be performed to complete an overall task. In one example, the system 100 supports the creation of object and action detection models and associated one or more configuration settings. For example, the configuration settings may map objects and object recognition models, and actions and action detection models with applicable contexts to activate the object recognition models and action detection models (and corresponding modifications to visual content).

However, it should be noted that in one example, the present disclosure specifically does not adhere to a workflow and does not have a required sequence of actions. Rather, AS 104 may detect an action of an expert user and may then determine how closely another user adheres to the action of the expert user, e.g., without any preconception as to which action will be performed, which action will follow next, etc., or with only a loose set of expectations as to which actions might be performed. For instance, for a router repair task, an action of "throwing" may be considered, with high confidence, to be an unlikely action. Other types of actions that may have been performed for prior router repair tasks may be scanned against the video stream with some expectation that they may be performed, but without specific requirements that they are in fact performed.

To illustrate, in the example of FIG. 1, user 191 may seek assistance from user 192 regarding a task involving object A and tool B (e.g., another object comprising a tool for working on object A). A visual communication session may therefore be established by device 131 and/or device 141 via AS 104 and over access networks 120, 122, etc. Video/visual data of user 191 may be transmitted by device 131 to AS 104 and forwarded to device 141, which may be presented via window 147 of user interface 145. Similarly, video/visual data of user 192 may be transmitted by device 141 to AS 104 and forwarded to device 131, which may be presented via window 137 of user interface 135. In the present example, user 192 may be improperly using tool B, which may be seen by user 192 (e.g., an expert). User 192 may therefore demonstrate a proper technique using object C and tool D (e.g., another object comprising a tool for working on object C). For instance, object C may be the same or similar to object A, and tool D may be the same or similar to tool D. Device 141 may transmit video of user 192 to AS 104, which may forward the video to device 131 for presentation via window 137 of user interface 135.

In addition to facilitating two-way video transmissions, AS 104 may further detect and recognize objects, and actions and/or intentions with respect to objects in both videos/visual data streams. For instance, user 191 may indicate that assistance is needed with respect to a particular task involving object A. In one example, AS 104 may, in response to the identification of the particular task, retrieve associated object detection models and action detection models (and in one example, a task workflow). For instance, in one example, detecting objects and detecting actions may be in accordance with models associated with particular tasks that may be identified in advance or at beginning of interaction, e.g., if it is known that second user has knee problems, it is expected to see and detect actions relating to thigh and calf, if it is known that second user is setting up a router, it is expected to see and detect a yellow cable being plugged-in to an Ethernet port on the router, etc. Thus, there may be particular models for detecting particular objects or types of objects that are selectively utilized when the type of task is known. In one example, AS 104 may determine the "relevance" of objects in the videos based upon user intention (e.g., an action with respect to an object) or knowledge of the task and the objects associated with the task (e.g., tools that are customarily used, parts to assemble a final item/object, etc.).

To illustrate, AS 104 may store visual information of various objects as object detection and/or recognition models. This may include one or more images of objects (e.g., from different angles), and may alternatively or additionally include feature sets derived from one or more images of the respective objects. For instance, for an object type of a particular router, AS 104 may store a respective scale-invariant feature transform (SIFT) model, or a similar reduced feature set derived from image(s) of the router, which may be used for detecting routers in the visual information from camera 132, camera 142, device 131, device 141, etc., via feature matching (and similarly for other objects). Thus, in one example, a feature matching detection algorithm employed by AS 104 may be based upon SIFT features. However, in other examples, different feature matching detection algorithms may be used, such as a Speeded Up Robust Features (SURF)-based algorithm, a cosine-matrix distance-based detector, a Laplacian-based detector, a Hessian matrix-based detector, a fast Hessian detector, etc.

The visual features used for detection and recognition of objects may include low-level invariant image data, such as colors (e.g., RGB (red-green-blue) or CYM (cyan-yellow-magenta) raw data (luminance values) from a CCD/photo-sensor array), shapes, color moments, color histograms, edge distribution histograms, etc. Visual features may also relate to movements in a video and may include changes within images and between images in a sequence (e.g., video frames or a sequence of still image shots), such as color histogram differences or a change in color distribution, edge change ratios, standard deviation of pixel intensities, contrast, average brightness, and the like.

In one example, AS 104 may perform an image salience detection process, e.g., applying an image salience model and then performing an image recognition algorithm over the "salient" portion of the video frame(s) or other visual information. Thus, in one example, visual features may also include a length to width ratio of an object, a velocity of an object estimated from a sequence of images (e.g., video frames), and so forth. Similarly, in one example, AS 104 may apply an object detection and/or edge detection algorithm to identify possible unique items in video or other visual information (e.g., without particular knowledge of the type of item; for instance, the object/edge detection may identify an object in the shape of a tree in a video frame, without understanding that the object/item is a tree). In this case, visual features may also include the object/item shape, dimensions, and so forth. In such an example, object recognition may then proceed as described above (e.g., with respect to the "salient" portions of the image(s) and/or video(s)).

In one example, the detection and/or recognition of objects and their locations and/or position in the visual data may be in accordance with one or more machine learning algorithms (MLAs), e.g., one or more trained machine learning models (MLMs). For instance, a machine learning algorithm (MLA), or machine learning model (MLM) trained via a MLA may be for detecting a single object, or may be for detecting a single object from a plurality of possible objects that may be detected via the MLA/MLM. For instance, the MLA (or the trained MLM) may comprise a deep learning neural network, or deep neural network (DNN), such as convolutional neural network (CNN), a generative adversarial network (GAN), a support vector machine (SVM), e.g., a binary, non-binary, or multi-class classifier, a linear or non-linear classifier, and so forth. In one example, the MLA/MLM may be a SIFT or SURF features-based detection model, as mentioned above. In one example, the MLA may incorporate an exponential smoothing algorithm (such as double exponential smoothing, triple exponential smoothing, e.g., Holt-Winters smoothing, and so forth), reinforcement learning (e.g., using positive and negative examples after deployment as a MLM), and so forth. It should be noted that various other types of MLAs and/or MLMs may be implemented in examples of the present disclosure, such as k-means clustering and/or k-nearest neighbor (KNN) predictive models, support vector machine (SVM)-based classifiers, e.g., a binary classifier and/or a linear binary classifier, a multi-class classifier, a kernel-based SVM, etc., a distance-based classifier, e.g., a Euclidean distance-based classifier, or the like, and so on. In one example, the object detection and/or recognition MLM(s) may be trained at a network-based processing system (e.g., AS 104, or the like). It should also be noted that various pre-processing or post-recognition/detection operations may also be applied. For example, AS 104 may apply an image salience algorithm, an edge detection algorithm, or the like (e.g., as described above) where the results of these algorithms may include additional, or pre-processed input data for the one or more MLAs. Thus, in the example of FIG. 1, AS 104 may apply any number of image pre-processing algorithms to videos, and may apply at least one object detection/recognition MLA to detect objects A, B, C, D, E, etc. of FIG. 1 from among various types of detectable objects in accordance with the one or more MLAs applied by and in operation on AS 104.

Similarly, in one example, an action detection model, or "signature" may be created that represents a particular action (e.g., where different actions may each have a respective model). The action detection model may comprise a machine learning algorithm (MLA), or machine learning model (MLM) trained via the MLA and which may comprise, for example, a deep learning neural network, or deep neural network (DNN), a generative adversarial network (GAN), a support vector machine (SVM), e.g., a binary, non-binary, or multi-class classifier, a linear or non-linear classifier, and so forth. In one example, the MLA may incorporate an exponential smoothing algorithm (such as double exponential smoothing, triple exponential smoothing, e.g., Holt-Winters smoothing, and so forth), reinforcement learning (e.g., using positive and negative examples after deployment as a MLM), and so forth. It should be noted that various other types of MLAs and/or MLMs may be implemented in examples of the present disclosure, such as k-means clustering and/or k-nearest neighbor (KNN) predictive models, support vector machine (SVM)-based classifiers, e.g., a binary classifier and/or a linear binary classifier, a multi-class classifier, a kernel-based SVM, etc., a distance-based classifier, e.g., a Euclidean distance-based classifier, or the like, and so on. In one example, the signature may include those features which are determined to be the most distinguishing features of the action, e.g., those features which are quantitatively the most different from what is considered statistically normal or average from visual content associated with a given participant, a group of participants, a given context, and/or in general, e.g., the top 20 features, the top 50 features, etc.

In one example, an action detection model, or "signature" may be created that represents multiple detected actions having a threshold similarity. In other words, the multiple detected actions are considered to be unique occurrences of a same action, or a same type of action. For instance, the action signature may comprise a machine learning model (MLM) that is trained based upon the plurality of features from a plurality of the same and/or similar events. For example, each of the similar events may comprise a set of features used as a positive example that is applied to a machine learning algorithm (MLA) to generate the action signature (e.g., a MLM). In one example, the positive examples used to train the MLM may be determined to be "similar" in accordance with an unsupervised, supervised, and/or semi-supervised clustering algorithm. In one example, the event detection model may be represented as an MLM comprising the average features of a cluster of the plurality of similar events in a feature space, a cluster centroid, or the like.

In one example, the action detection model (e.g., a MLM) may be applied to process outbound and/or inbound visual content and to identify patterns in the features of the visual content that match the action detection model/signature. In one example, a match may be determined using any of the visual features and/or other features mentioned above. For instance, a match may be determined when there is a threshold measure of similarity among the features of the visual content and the action detection model. In one example, the threshold measure of similarity may alternatively or additionally include matching additional features associated with measurements from wearable devices and/or other sensors. In one example, the features from the visual content and/or additional features may be analyzed using a time-based sliding window. Thus, the next time there is a similar sequence of events, e.g., similar imagery and/or movements as recorded by wearable devices and/or other sensors, it may be associated with the action type and may be identified as a potential additional occurrence of the same action.

In the present example, object A and tool B may be detected via object detection and/or recognition models and determined to be relevant based upon the movement of tool B by user 191 detected via an action detection model and/or based upon the association of tool B with the task involving object A. Similarly, object C and tool D may be detected via object recognition models and determined to be relevant based upon the movement of tool D by user 192 detected via an action detection model and/or based upon the association of tool D with the task involving object C. Alternatively, or in addition, object C and tool D may be determined to be relevant based upon a prior determination that object A and tool B are relevant and a determination that object A and tool B are congruent with object C and tool D, respectively. In one example, relevance of any or all of objects A and C and tools B and D may be further determined based upon speech detection and analysis identifying particular objects. For instance, user 191 may ask "How hard do I turn the screwdriver on the back of the router?" If tool B is a screwdriver and object A is a router, then these items may be further determined by AS 104 to be relevant, or the relevance confirmed via the detection of at least the words "screwdriver" and "router" in the speech of user 191.

It should be noted that in one example, AS 104 may further determine any irrelevant objects, or specific sensitive objects that may be removed or obscured from the video/visual feed of one user prior to being forwarded to the device of the other user. For example, object E may be a stack of papers which may be identified by AS 104 as a "stack of papers" via an object detection/recognition model and analysis of the video from device 141, or may simply be detected as an object that is not relevant (e.g., if it is not an object having an object detection model associated with the task and is not otherwise determined to be relevant based upon the action(s)/intention(s) of user 192, such as by picking up or touching the stack of papers). In this case, AS 104 may determine object E is irrelevant and may dynamically blur object E from the video forwarded to device 131. Thus, as illustrated in FIG. 1, the window 137 of user interface 135 shows obscured area 182 where object E would otherwise be seen. However, in another example, object E may be excluded entirely from the video presented in window 137.

As noted above, there may be particular models for detecting particular types of actions and quantifying the actions when the type of task is known. In one example, an action may be detected by sensors of force feedback gloves 133 and 134 and force feedback gloves 143 and 144 that sense force in fingers, palm, etc., but also X, Y, Z movement/displacement, acceleration, or the like via gyroscope and compass, or similar sensors. Accordingly, in one example, objects may be known via object detection/recognition, and then the action(s) quantified via the force feedback glove(s). Alternatively, or in addition, actions may be quantified via video analysis to identify a displacement of an object, e.g., between video frames, or similarly for acceleration, rotation, etc.

In one example, AS 104 may detect a difference between an action of user 192 and an action of user 191 and provide a notification indicative of the difference. For example, the actions may be quantified as described above. In addition, when the two actions are the same or similar, and are determined to relate to similar objects (e.g., rotations of objects A and C), the quantified actions may be compared and the difference(s) recorded. For example, if tool B is moved 10 inches and tool D is moved 6 inches, the difference of 4 inches may be recorded. Similarly, if the pressure in a finger sensor of force feedback glove 143 is recorded as 45 psi and the pressure in a finger sensor of force feedback glove 133 is recorded as 30 psi while holding objects A and C, respectively, the difference of 15 psi may be recorded. Thus, in various examples, the difference may be "difference in displacement," "difference in rotation," "difference in force in index finger and thumb," "difference in grip force," "difference in contact in $4^{th}$ and 5th fingers of right hand," etc. In addition, corresponding notifications indicative of the difference may simply report the difference(s), or may provide a recommendation, such as "insufficient displacement" (or "move tool B a little further"), "insufficient rotation" (or "rotate object A approximately 90 degrees"), "insufficient force in index finger and thumb," "insufficient grip force," "lack of contact in 4th and $5^{th}$ fingers of right hand" (or "make contact with object A in 4th and $5^{th}$ fingers of right hand"), etc.

In one example, AS 104 may send the notification or recommendation to one or both of users 191 and 192 via devices 131 and/or 141. However, in one example, it may transmitted to user 192 (who may be an expert) who may then decide whether the recommendation is actionable (where the notification is not transmitted to user 191). If determined to be actionable, user 192 may then choose to instruct user 191 accordingly, e.g., verbally via the video/visual feed from device 131 that is sent to device 141 via the visual communication session. For instance, differences may be alerted to user 192, but the user 192 may determine that the differences are inconsequential and may be ignored, or may choose to take note of any substantial differences that may call for correction of the action(s) of user 191. For instance, as illustrated in FIG. 1, user 191 may be holding tool B in a steady position, whereas user 192 may be demonstrating a proper technique using the similar/corresponding tool D, e.g., waving tool D, rotating tool D, or the like. Any detected differences at such initial demonstrations may be deemed to be inconsequential and the alerts can be ignored or even suppressed based on user input.

In one example, user 192 may tangibly and palpably demonstrate proper technique for user 191 using tactile feedback and control by actions captured via sensors of force feedback gloves 143 and 144 and translated into control signals for generating corresponding actions via actuators of force feedback gloves 133 and 134. For instance, user 192 may verbally instruct user 191 to place tool B on the back of object A and hold the position. Then, user 192 may activate remote control functionality via AS 104. For instance, user 192 may speak a command such as "remote glove control" or "expert takeover," which may be interpreted by AS 104 and recognized as a command to activate remote control. Alternatively, or in addition, user 192 may perform a gesture via one or both of the force feedback gloves 143 and 144 to similarly provide such a command (such as tapping the left index finger four times, squeezing the 4th finger and thumb together two times, etc.). In one example, user 191 may provide a consent or confirmation to allow remote takeover, such as making a similar gesture, or speaking a verbal assent/confirmation, such as "ready for takeover," "takeover go," etc. that may be captured by a microphone of device 131 and included in or accompanying the video/visual data stream to be received and recognized by AS 104.

Thus, user 192 may cause the proper action(s) to be performed with respect to object A, e.g., using tool B via remote control of force feedback gloves 133 and 134 using force feedback gloves 143 and 144. For instance, user 192 may arrange object C and tool D in substantially the same positions as object A and tool B are arranged by user 191 immediately before and at the time of the remote takeover. Then, user 192 may perform one or more actions on object C using tool D, which results in corresponding actions on object A using tool B via the remote control of force feedback gloves 133 and 134 using force feedback gloves 143 and 144.

Figure 2:
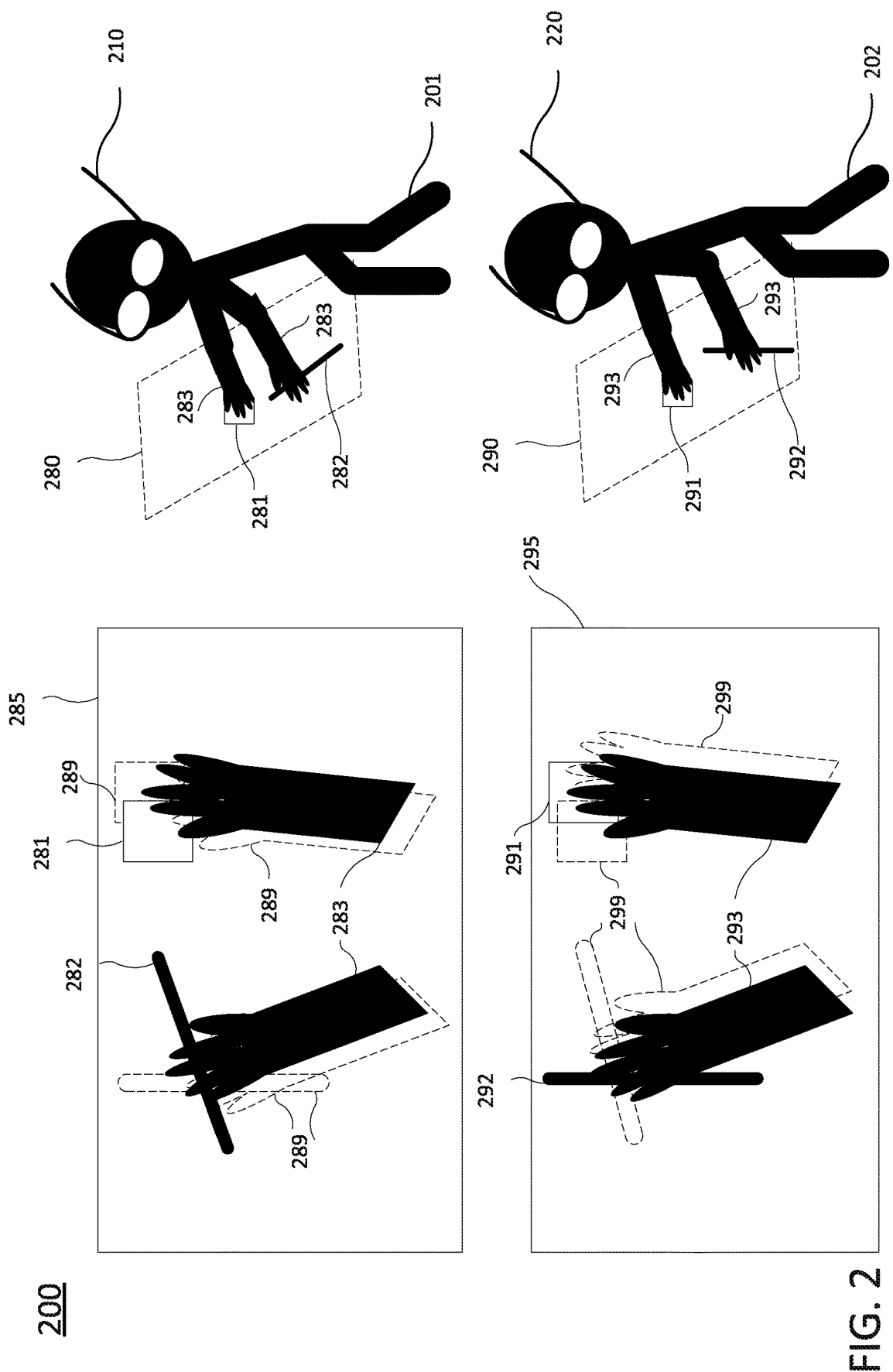
FIG. 2 illustrates an example of a visual communication session between a first user and a second user having respective wearable augmented reality devices.

The foregoing describes an example of a network-based application via AS 104. However, it should be understood that in other, further, and different examples, the same or similar functionality may alternatively or additionally be applied locally, e.g., at device 131 and/or at device 141, such as in a peer-to-peer session that does not involve AS 104, or where some (but not all) functions of AS 104 may instead be performed by device 131 and/or device 141 (such as object detection, relevance detection, voice command interpretation, etc.). It should also be noted that the foregoing is described primarily in connection with wearable devices 131 and 141. However, in other, further, and different examples, other devices, such as cameras 132 and 142 (e.g., non-wearables), may be utilized in connection with a visual communication session. For instance, for an intricate carving process, camera 142 may be situated above a tabletop where user 192 is working and pointed downward to capture the hands of user 192 and the object(s) being worked on or worked with, etc. In one example, a user may switch views from a camera of a wearable device to an external camera, or the remote user on the other end of the visual communication session, such as an expert user, may choose to change which feed is received (or to receive and present both feeds simultaneously in different windows of the user interface). In addition, the example of FIG. 1 illustrates just one example of how two-way AR content may be visually presented for respective users via user interfaces 135 and 145. For instance, FIG. 2 illustrates another example of how two-way AR content may be visually presented for respective users. Thus, these and other modifications are all contemplated within the scope of the present disclosure.

It should also be noted that the system 100 has been simplified. Thus, it should be noted that the system 100 may be implemented in a different form than that which is illustrated in FIG. 1, or may be expanded by including additional endpoint devices, access networks, network elements, application servers, etc. without altering the scope of the present disclosure. In addition, system 100 may be altered to omit various elements, substitute elements for devices that perform the same or similar functions, combine elements that are illustrated as separate devices, and/or implement network elements as functions that are spread across several devices that operate collectively as the respective network elements. For example, the system 100 may include other network elements (not shown) such as border elements, routers, switches, policy servers, security devices, gateways, a content distribution network (CDN) and the like. For example, portions of network 102, access networks 120 and 122, and/or Internet may comprise a content distribution network (CDN) having ingest servers, edge servers, and the like for packet-based streaming of video, audio, or other content. Similarly, although only two access networks, 120 and 122 are shown, in other examples, access networks 120 and/or 122 may each comprise a plurality of different access networks that may interface with network 102 independently or in a chained manner. Thus, these and other modifications are all contemplated within the scope of the present disclosure.

FIG. 2 illustrates an example of a visual communication session 200 between a first user 201 and a second user 202 having respective wearable AR devices 210 and 220. Visible space 280 may represent the area or region that may be recorded via AR device 210. Similarly, visible space 290 may represent the area or region that may be recorded via AR device 220. AR environment 285 may comprise a combination of real-world visible objects and AR overlay content that are perceptible to the user 201, and in one example may have the same size and/or shape as visible space 290. Thus, for example, real objects 281 and 282, as well as hands wearing force feedback gloves 283 may be visible in the AR environment 285. The outlined content 289 may represent overlaid AR content, e.g., "virtual objects" presented by a projector of AR device 210, which may comprise video from AR device 220 comprising objects from the visible space 290, and which may be presented with some opacity such that the outlined content 289 is visible but does not completely obscure aspects of the physical environment. In the same manner, AR environment 295 may comprise a combination of real-world visible objects and AR overlay content/virtual objects that are perceptible to the user 202. Thus, for example, real objects 291 and 292, as well as hands wearing force feedback gloves 293 may be visible in the AR environment 295. The outlined, overlay content 299 in the AR environment 295 may represent overlaid AR content, e.g., virtual objects presented by a projector of AR device 220, which may comprise video from AR device 210 comprising objects from the visible space 280. For example, user 201 may be an expert demonstrating a proper technique of using a tool (e.g., object 282) on object 281. User 201 may see that user 202 has positioned the corresponding tool (e.g., object 292) incorrectly by virtue of the overlay content 289 presented in AR environment 285. Likewise, user 202 may see that user 202 has positioned the tool (e.g., object 292) incorrectly by virtue of the overlay content 299 presented in AR environment 295. Notably, in the example of FIG. 2, while the objects 281 and 291 are not necessarily aligned perfectly, the difference may be sufficiently insubstantial such that no correction may be necessary, or it may be at least not worth drawing attention to the difference.

In another example, to simplify demonstration for the learning user 202, the display of AR environment 295 may perfectly align (e.g., "snap" or "lock") some overlay content of user 201 (e.g., portion of overlay content 299 representing the force feedback gloves 283) with the content of user 202 (e.g., the force feedback gloves 293) to exactly align hand position while explicitly demonstrating the incorrect orientation of the manipulated objects (portion(s) of overlay content 299 representing object 282 or 281 with actual object 292 or 291). At the same time, the view for the expert or leading user 201 in AR environment 285 may have the portion of the overlay content 289 representing force feedback gloves 283 that are not aligned or snapped to match. This example may allow improved instructions of technique from the first user 201 while simultaneously simplifying the manipulation of objects by the second user 202. In yet another example, although not depicted in FIG. 2, both AR environments 285 and 295 (e.g., the users' views) may first aligned on a specific object of interest, such as object 281 and object 291, which may be focal point of the task (e.g. a mobile phone or router), attached to an additional object (e.g. the door of a car), or an immovable object (e.g. a heating ventilation and air conditioning (HVAC) condenser). The system may first automatically align a portion of overlay content 289 representing object 291 with object 281, and a portion of overlay content 299 representing object 281 with object 291 as a first step in the process. This first alignment process may guarantee that both users 201 and 202 are correctly oriented for the object regardless of the positions in their respective physical environments.

Figure 3:
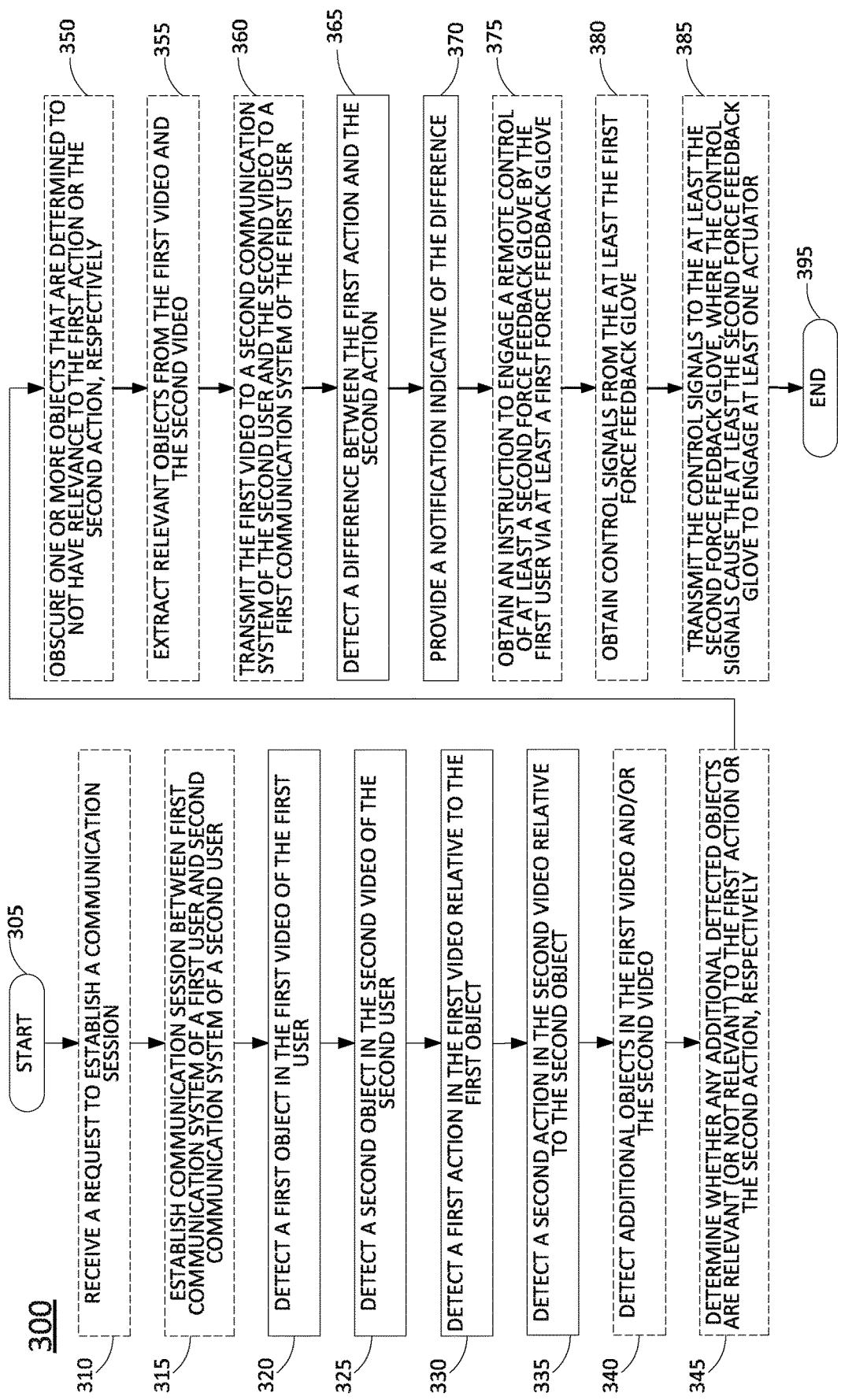
FIG. 3 illustrates a flowchart of an example method for providing a notification indicative of a detected difference in actions relating to a first object in a first video and a second object in a second video of a visual communication session.

FIG. 3 illustrates a flowchart of an example method 300 for detecting and modifying actions of visual representations of users in visual content, in accordance with the present disclosure. In one example, the method 300 is performed by a component of the system 100 of FIG. 1, such as by application server 104, device 131, or device 141, and/or any one or more components thereof (e.g., a processor, as processors, performing operations stored in and loaded from a memory), or by application server 104, in conjunction with one or more other devices, such as device 131, device 141, and so forth. In one example, the steps, functions, or operations of method 300 may be performed by a computing device or system 400, and/or processor 402 as described in connection with FIG. 4 below. For instance, the computing device or system 400 may represent any one or more components of application server 104, device 131, or device 141 in FIG. 1 that is/are configured to perform the steps, functions and/or operations of the method 300. Similarly, in one example, the steps, functions, or operations of method 300 may be performed by a processing system comprising one or more computing devices collectively configured to perform various steps, functions, and/or operations of the method 300. For instance, multiple instances of the computing device or processing system 400 may collectively function as a processing system. For illustrative purposes, the method 300 is described in greater detail below in connection with an example performed by a processing system. The method 300 begins in step 305 and may proceed to optional step 310 or to step 320.

At optional step 310, the processing system may receive a request to establish a communication session (e.g., a visual communication session) from at least one of a first communication system of a first user or a second communication system of a second user. The processing system may include at least one processor deployed in a communication network. The processing system may alternatively or additionally comprise the first communication system of the first user, the second communication system of the second user, and/or network-based components. The communication session may be for a video call, a two-way AR session, or the like. The first communication system and the second communication system may comprise wearable devices, such as AR devices 210 and 220 of FIG. 2, devices 131 and 141 of FIG. 1, or the like. In one example, the first communication system and the second communication system may include at least a first force feedback glove and at least a second force feedback glove, respectively.

At optional step 315, the processing system may establish a communication session between at least a first communication system of a first user and a second communication system of a second user, the communication session including first video of the first user second video of the second user (e.g., to be exchanged between the user's respective communication systems). It should also be noted that although the terms, "first," "second," "third," etc., are used herein, the use of these terms are intended as labels only. Thus, the use of a term such as "third" in one example does not necessarily imply that the example must in every case include a "first" and/or a "second" of a similar item. In other words, the use of the terms "first," "second," "third," and "fourth," do not imply a particular number of those items corresponding to those numerical values. In addition, the use of the term "third" for example, does not imply a specific sequence or temporal relationship with respect to a "first" and/or a "second" of a particular type of item, unless otherwise indicated.

At step 320, the processing system detects a first object in the first video of the first user. In one example, the detecting of the first object is via an object recognition model (e.g., a visual object recognition model that uses visual data of the first video as input and which outputs an indication of whether or not an object of a particular type associated with the object recognition model). In one example, the detecting of the first object is further in accordance with user account information of the second user, an indication of a task associated with the first object, and/or other factors. For instance, if it is known that the first user is seeking assistance with a particular task, and the task is known to be associated with one or more specific objects (e.g., including at least the first object) then the processing system may monitor the first video for those one or more specific objects. For example, one or more object recognition models that are specific to the object(s) associated with the task may be activated for scanning against the visual content. Similarly, if it known (e.g., from user account information) that a user has a particular type of equipment, such as a particular type of television, a particular router make and model, or the like, then the processing system may be configured to specifically look for and detect such object(s) via respective object detection model(s) for such object(s).

At step 325, the processing system detects a second object in the second video of the second user (e.g., where the first video and the second video are part of the visual communication session between the first user and the second user). In one example, the detecting of the second object is via a same object recognition model that is used at step 320. For instance, the first object and the second object may be a same type of object. In one example, the first object and the second object may be a same type of body part of the first user and the second user. In another example, the first object and the second object may be a same type of equipment, e.g., electronic equipment, mechanical equipment, and so forth. In one example, the detecting of both the first object and the second object may be further in accordance with at least one of: user account information of the second user or an indication of a task associated with the first object and the second object.

At step 330, the processing system detects a first action in the first video relative to the first object. For instance, the processing system may scan the first video against active action detection models for detecting particular types of actions and for quantifying the actions when the type of task is known. For instance, types of actions that may be expected and that may be detected via the one or more action detection models may be "throwing," "swinging," "chopping," "twisting," etc. In one example, the action detection model(s) may be specific to particular objects, e.g., "twisting screwdriver," "twisting rope," etc. Thus, the processing system may detect the first action via a first action detection model for detection the particular type of action. In one example, the action may be detected by sensors of force feedback gloves worn by the first user that sense force in fingers, palm, etc., but also 3D movement/displacement, acceleration, or the like via gyro and compass, or similar sensors. Thus, the first object may be detected via an object detection/recognition model at step 320, and then the first action may be quantified via the force feedback glove(s) at step 330. Alternatively, or in addition, the first action may be quantified via video analysis to identify a displacement of the first object, e.g., between frames of the first video, and similarly for acceleration, rotation, etc.

Accordingly, it should be noted that in various examples, the first action in the first video relative to the first object may comprise a manipulation of the first object detected via at least one of the first video or at least a first force feedback glove of the first user, or a manipulation of at least a third object (such as a tool, an integral/constituent part of the first object, etc.) relative to the first object detected via at least one of the first video or at least the first force feedback glove. In addition, the "manipulation" may comprise movement (e.g., displacement or rotation), squeezing, pressing, etc., may be quantified in terms of distance, force applied, number of turns, or multiple aspects, depending upon the type of action and what is detectable via the system capabilities in terms of visibility from camera perspective, available sensor data, etc.

In one example, the first action detection model comprises a machine learning model (MLM) for detecting the first action. The MLM may identify, from the first video, features of the first user (and or the first object) that distinguish the first action from visual content that does not contain the first action. In one example, the features are from a feature space comprising quantified aspects of the visual content. Quantified aspects may include low-level invariant image data, features relating to movement in a video, e.g., changes within images and between images, recognized objects (e.g., including parts of a human body such as legs, arms, hands, etc.), a length to width ratio of an object, a velocity of an object estimated from a sequence of images (e.g., video frames), and so forth. In one example, features may additionally be taken from wearable device inputs such as gyroscope and compass measurements from various points of a human body (e.g., force feedback glove(s) and/or sensors positioned on other parts of the body, such as elbows, shoulders, etc.), eye movements, and so forth.

The first action detection model/MLM can be trained from input of other users regarding actions by various other users. In one example, the first action detection model may be activated by the processing system for detection when the task is known. In one example, the processing system may select the first action detection model for active use when one or more context criteria are met. For instance, the processing system may activate the action detection model when the context includes one or more of: a physical location of the first user, a physical location of the second user, a time of day, a type of task for the communication session, a topic of the communication session, and so forth. In one example, the context may be that the first user has provided an input to the processing system indicating the task, or task type, a problem with a particular type of equipment, etc., and/or may include the same or similar information obtained via a user profile, user account record, or the like.

At step 335, the processing system detects a second action in the second video relative to the second object. In one example, step 335 may be the same or similar as discussed above with respect to step 330. For instance, the second action may be a same type of action as the first action (and may be with respect to the second object, which may be the same or similar to the first object). In various examples, the second action in the second video relative to the second object may comprise at least one of a manipulation of the second object detected via at least one of the second video or at least a second force feedback glove of the second user or a manipulation of at least a fourth object (such as a tool, an integral/constituent part of the second object, etc.) relative to the second object detected via at least one of the second video or the at least the second force feedback glove. Thus, it should be noted that in one example, the first user engages in the first action via at least a first force feedback glove, and wherein the second user engages in the second action via at least a second force feedback glove.

At optional step 340, the processing system may detect additional objects in the first video and/or the second video, e.g., at least a "fifth" object in the second video and/or at least a "sixth" object in the first video, etc. In one example, optional step 340 may be the same or similar to steps 320 and 325. Alternatively, or in addition, optional step 340 may comprise detecting one or more objects, without any specific determination of the type of object(s). For instance, optional step 340 may identify one or more objects by distinguishing such objects from each other, from the first and second objects identified at steps 320 and 325, and from other aspects of the respective environments, such as via edge detection algorithm(s), or the like.

At optional step 345, the processing system may determine whether any additional detected objects are relevant (or not relevant) to the first action or the second action, respectively. For instance, objects may be detected and/or recognized via object detection and/or recognition models at optional step 340 and may be determined to not be relevant to a task, e.g., where the task is associated with "relevant" objects, and where other objects may thus be categorized as "not relevant." Alternatively, or in addition, objects may be detected in a general sense, e.g., determining the outlines of objects to distinguish from other objects, without any particular determination as to what the object is. In this case, some objects may be recognized, such as the first object and the second object, via one or more object recognition models. However, other objects, while detected and distinguished from other objects, may not be recognized. In one example, unrecognized objects may be categorized as "not relevant," unless there is a particular action of the first user or the second user directed toward an unrecognized object, in which case, even though the object is unrecognized, the object may be categorized as "relevant" to the task. For example, at least a "fifth" object in the second video and/or at least a "sixth" object in the first video may be determined to be "not relevant" at optional step 345.

At optional step 350, the processing system may obscure one or more objects that are determined to not have relevance to the first action or the second action, respectively (for instance, at least a "fifth" object in the second video and/or at least a "sixth" object in the first video). The obscuring may include blocking out a region of the first video or the second video in which the non-relevant object(s) are located, blurring, replacing with another image or images (such as a logo, a "redacted" sign, etc.), and so forth. The modification(s) of optional step 350 may be selected by one or both of the users, may be defined in connection with a default or standard profile that may be selected by or for a user, and/or may be associated with the particular task.

At optional step 355, the processing system may extract relevant objects from the first video and the second video. For instance, the first video may be modified to exclude background and/or non-relevant objects. In other words, the relevant objects may remain in the first video and the second video respectively, while extraneous visual content may be removed.

At optional step 360, the processing system may transmit the first video to a second communication system of the second user and the second video to a first communication system of the first user (e.g., with any modifications as per optional step 350 or optional step 355).

At step 365, the processing system detects a difference between the first action and the second action. For instance, actions may be quantified/measured in terms of movement (e.g., displacement or rotation), squeezing, pressing, etc., may be quantified in terms of applied force, number of turns, or multiple aspects, depending upon the type of action and what is detectable via the system capabilities in terms of visibility from camera perspective, force feedback glove capabilities, other available sensor data, etc. Accordingly, the differences in the actions may be determined by comparing and noting the differences in the corresponding measurements on the side of the first user and the side of the second user. It should be noted that in one example, the detecting the difference between the first action and the second action may comprise detecting a difference between a manipulation of the first object and a manipulation of the second object, or detecting a difference between a manipulation of at least the third object relative to the first object and a manipulation of at least the fourth object relative to the second object (e.g., where the third and/or fourth objects may be those discussed above with respect to steps 330 and 335).

At step 370, the processing system provides a notification indicative of the difference. In one example, the notification indicative of the difference may simply report the difference(s). In one example, the notification may comprise a recommendation for an adjustment associated with the second action based on the difference, such as "insufficient displacement," "move tool B a little further," etc. In one example, the processing system may send the notification or recommendation to one or both of the user via the respective communication systems. However, in one example, the notification may be sent to an expert user (e.g., the first user) who may then decide whether the notification is actionable (e.g., where the notification is not sent to the second user). In one example, the notification may be presented audibly, e.g., by inserting audio into the first and/or second video, or by sending an audio side-stream, and/or via a respective AR display or displays of the first and/or second communication systems, etc. In one example, the notification may comprise a recommendation in the form of a visual indication relative to at least the second object via an augmented reality display of the second user. For example, the processing system may add to the first video an arrow pointing at the correct location(s) to align the second object with a tool, a highlighting on a particular object (e.g., the second object) or part of the object, etc.

At optional step 375, the processing system may obtain an instruction to engage a remote control of the at least the second force feedback glove by the first user via the at least the first force feedback glove. The instruction may be a voice command that is extracted from the first video by the processing system and recognized via a speech detection and recognition model. In one example, the model may include natural language processing (NLP) which may enable the processing system to interpret the command. However, in another example, the model may be a more basic speech detection model for detecting a particular defined command from a smaller set of defined available commands.

At optional step 380, the processing system may obtain control signals from the at least the first force feedback glove. For instance, data from sensors of the at least the first force feedback glove may be used to detect the first action at step 330, but may alternatively or additionally be used as control signals, or may be translated into control signals for controlling the at least the second force feedback glove.

At optional step 385, the processing system may transmit the control signals to the at least the second force feedback glove, where the control signals cause the at least the second force feedback glove to engage at least one actuator of the at least the second force feedback glove. In one example, the control signals may be transmitted to/via the second communication system of the second user.

Following step 370, or any of the optional steps 375-385, the method 300 proceeds to step 395 where the method ends.

It should be noted that the method 300 may be expanded to include additional steps, or may be modified to replace steps with different steps, to combine steps, to omit steps, to perform steps in a different order, and so forth. For instance, in one example the processing system may repeat one or more steps of the method 300, such as steps 330-370 or steps 330-385 for additional actions or tasks with respect to a workflow, steps 310-370 or steps 310-385 for additional visual communication of the same or different users with respect to the same or different tasks, etc. In still another example, the method 300 may be expanded to include task detection and then selecting object recognition models and/or action detection models in accordance with the task. For instance, the processing may apply topic models (e.g., classifiers) for a number of task to the first video and/or the second video to identify a task. The topic model classifiers can be trained from any text, video, image, audio and/or other types of content to recognize various topics, which may include objects like "car," scenes like "outdoor," and actions or events like "baseball." Topic identification classifiers may include support vector machine (SVM) based or non-SVM based classifiers, such as neural network based classifiers and may utilize the same or similar features extracted from the first video or the second video that may be used to identify objects and/or actions. Once a task is identified, the task may be further correlated with object recognition and/or action detection models. Thus, these and other modifications are all contemplated within the scope of the present disclosure.

In addition, although not expressly specified above, one or more steps of the method 300 may include a storing, displaying and/or outputting step as required for a particular application. In other words, any data, records, fields, and/or intermediate results discussed in the method can be stored, displayed and/or outputted to another device as required for a particular application. Furthermore, operations, steps, or blocks in FIG. 3 that recite a determining operation or involve a decision do not necessarily require that both branches of the determining operation be practiced. In other words, one of the branches of the determining operation can be deemed as an optional step. Furthermore, operations, steps or blocks of the above described method(s) can be combined, separated, and/or performed in a different order from that described above, without departing from the example embodiments of the present disclosure.

FIG. 4 depicts a high-level block diagram of a computing device or processing system specifically programmed to perform the functions described herein. For example, any one or more components or devices illustrated in FIG. 1 or described in connection with the examples of FIGS. 2 and 3 may be implemented as the processing system 400. As depicted in FIG. 4, the processing system 400 comprises one or more hardware processor elements 402 (e.g., a microprocessor, a central processing unit (CPU) and the like), a memory 404, (e.g., random access memory (RAM), read only memory (ROM), a disk drive, an optical drive, a magnetic drive, and/or a Universal Serial Bus (USB) drive), a module 405 for providing a notification indicative of a detected difference in actions relating to a first object in a first video and a second object in a second video of a visual communication session, and various input/output devices 406, e.g., a camera, a video camera, storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like).

Although only one processor element is shown, it should be noted that the computing device may employ a plurality of processor elements. Furthermore, although only one computing device is shown in the Figure, if the method(s) as discussed above is implemented in a distributed or parallel manner for a particular illustrative example, i.e., the steps of the above method(s) or the entire method(s) are implemented across multiple or parallel computing devices, e.g., a processing system, then the computing device of this Figure is intended to represent each of those multiple general-purpose computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented. The hardware processor 402 can also be configured or programmed to cause other devices to perform one or more operations as discussed above. In other words, the hardware processor 402 may serve the function of a central controller directing other devices to perform the one or more operations as discussed above.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computing device, or any other hardware equivalents, e.g., computer readable instructions pertaining to the method(s) discussed above can be used to configure a hardware processor to perform the steps, functions and/or operations of the above disclosed method(s). In one example, instructions and data for the present module or process 405 for providing a notification indicative of a detected difference in actions relating to a first object in a first video and a second object in a second video of a visual communication session (e.g., a software program comprising computer-executable instructions) can be loaded into memory 404 and executed by hardware processor element 402 to implement the steps, functions or operations as discussed above in connection with the example method(s). Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 405 for providing a notification indicative of a detected difference in actions relating to a first object in a first video and a second object in a second video of a visual communication session (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various embodiments have been described above, it should be understood that they have been presented by way of example only, and not limitation. Thus, the breadth and scope of a preferred embodiment should not be limited by any of the above-described example embodiments, but should be defined only in accordance with the following claims and their equivalents.

What is claimed is:

1. A method comprising:
   detecting, by a processing system including at least one processor, a first object in a first video of a first user;
   detecting, by the processing system, a second object in a second video of a second user, wherein the first video and the second video are part of a visual communication session between the first user and the second user;
   detecting, by the processing system, a first action in the first video relative to the first object, wherein the first user engages in the first action via at least a first force feedback glove;
   detecting, by the processing system, a second action in the second video relative to the second object, wherein the second user engages in the second action via at least a second force feedback glove;

detecting, by the processing system, a difference between the first action and the second action;

providing, by the processing system, a notification indicative of the difference; and obtaining, by the processing system, an instruction to engage a remote control of the at least the second force feedback glove by the first user via the at least the first force feedback glove.

2. The method of claim 1, wherein the first object and the second object are a same type of object.

3. The method of claim 2, wherein the first object and the second object are a same type of body part of the first user and the second user.

4. The method of claim 2, wherein the first object and the second object are a same type of equipment.

5. The method of claim 1, wherein the detecting of the first object is via an object recognition model.

6. The method of claim 5, wherein the detecting of the first object is further in accordance with at least one of:
 user account information of the second user; or
 an indication of a task associated with the first object.

7. The method of claim 5, wherein the detecting of the second object is via the object recognition model.

8. The method of claim 7, wherein the detecting of the first object and the detecting of the second object are further in accordance with at least one of:
 user account information of the second user; or
 an indication of a task associated with the first object and the second object.

9. The method of claim 1, further comprising:
 obtaining control signals from the at least the first force feedback glove; and
 transmitting the control signals to the at least the second force feedback glove, wherein the control signals cause the at least the second force feedback glove to engage at least one actuator of the at least the second force feedback glove.

10. The method of claim 1, further comprising:
 detecting at least a third object in the second video; and
 obscuring the at least the third object in the second video.

11. The method of claim 10, wherein the at least the third object is determined to not have a relevance to the second action in the second video relative to the second object.

12. The method of claim 10, further comprising:
 detecting at least a fourth object in the first video; and
 obscuring the at least the fourth object in the first video, wherein the at least the fourth object is determined to not have a relevance to the first action in the first video relative to the first object.

13. The method of claim 1, wherein the notification comprises a visual indication relative to at least the second object via an augmented reality display of the second user.

14. The method of claim 1, wherein the first action in the first video relative to the first object comprises at least one of:
 a manipulation of the first object detected via at least one of the first video or at least the first force feedback glove of the first user; or
 a manipulation of at least a third object relative to the first object detected via at least one of the first video or the at least the first force feedback glove.

15. The method of claim 14, wherein the second action in the second video relative to the second object comprises at least one of:
 a manipulation of the second object detected via at least one of the second video or at least the second force feedback glove of the second user; or
 a manipulation of at least a fourth object relative to the second object detected via at least one of the second video or the at least the second force feedback glove.

16. The method of claim 15, wherein the detecting the difference between the first action and the second action comprises:
 detecting a difference between the manipulation of the first object and the manipulation of the second object; or
 detecting a difference between the manipulation of the at least the third object relative to the first object and the manipulation of the at least the fourth object relative to the second object.

17. A non-transitory computer-readable medium storing instructions which, when executed by a processing system including at least one processor, cause the processing system to perform operations, the operations comprising:
 detecting a first object in a first video of a first user;
 detecting a second object in a second video of a second user, wherein the first video and the second video are part of a visual communication session between the first user and the second user;
 detecting a first action in the first video relative to the first object, wherein the first user engages in the first action via at least a first force feedback glove;
 detecting a second action in the second video relative to the second object, wherein the second user engages in the second action via at least a second force feedback glove;
 detecting a difference between the first action and the second action;
 providing a notification indicative of the difference; and
 obtaining an instruction to engage a remote control of the at least the second force feedback glove by the first user via the at least the first force feedback glove.

18. A device comprising:
 a processing system including at least one processor; and
 a computer-readable medium storing instructions which, when executed by the processing system, cause the processing system to perform operations, the operations comprising:
 detecting a first object in a first video of a first user;
 detecting a second object in a second video of a second user, wherein the first video and the second video are part of a visual communication session between the first user and the second user;
 detecting a first action in the first video relative to the first object, wherein the first user engages in the first action via at least a first force feedback glove;
 detecting a second action in the second video relative to the second object, wherein the second user engages in the second action via at least a second force feedback glove;
 detecting a difference between the first action and the second action;
 providing a notification indicative of the difference; and
 obtaining an instruction to engage a remote control of the at least the second force feedback glove by the first user via the at least the first force feedback glove.

19. The device of claim 18, wherein the first action in the first video relative to the first object comprises at least one of:

a manipulation of the first object detected via at least one of the first video or at least the first force feedback glove of the first user; or a manipulation of at least a third object relative to the first object detected via at least one of the first video or the at least the first force feedback glove.

20. The device of claim 19, wherein the second action in the second video relative to the second object comprises at least one of:

a manipulation of the second object detected via at least one of the second video or at least the second force feedback glove of the second user; or a manipulation of at least a fourth object relative to the second object detected via at least one of the second video or the at least the second force feedback glove.

* * * * *